May 3, 1955  T. M. GLUYAS, JR  2,707,772
COAXIAL TRANSMISSION LINE SECTION
Filed Sept. 7, 1949  3 Sheets-Sheet 1

INVENTOR
Thomas M. Gluyas, Jr.
BY
J. L. Whittaker
ATTORNEY

May 3, 1955
T. M. GLUYAS, JR
2,707,772
COAXIAL TRANSMISSION LINE SECTION
Filed Sept. 7, 1949
3 Sheets-Sheet 2
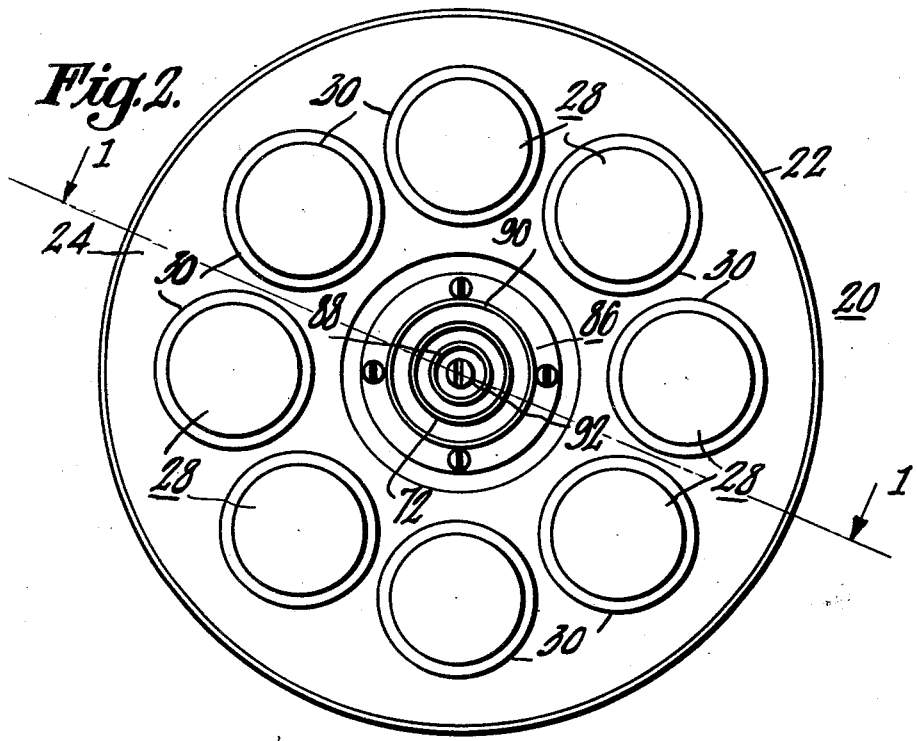
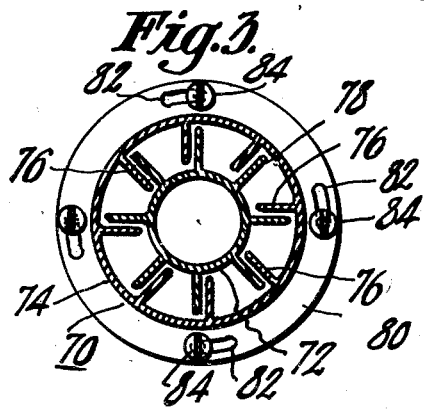
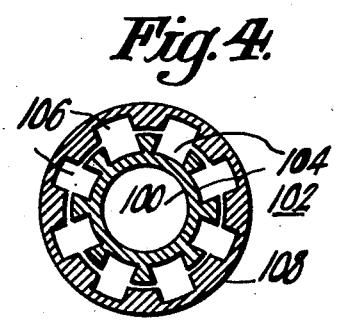
INVENTOR
Thomas M. Gluyas, Jr.
BY
J. L. Whittaker
ATTORNEY May 3, 1955 T. M. GLUYAS, JR 2,707,772
COAXIAL TRANSMISSION LINE SECTION
Filed Sept. 7, 1949 3 Sheets-Sheet 3
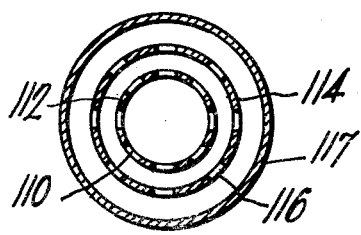
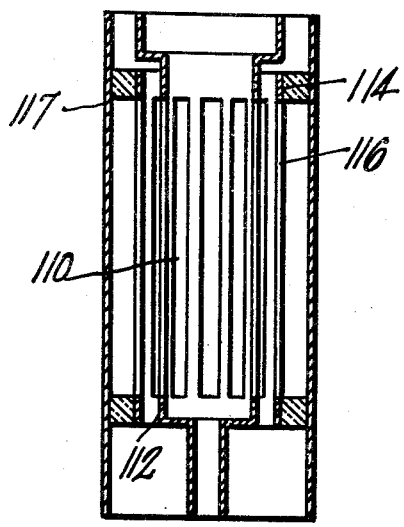
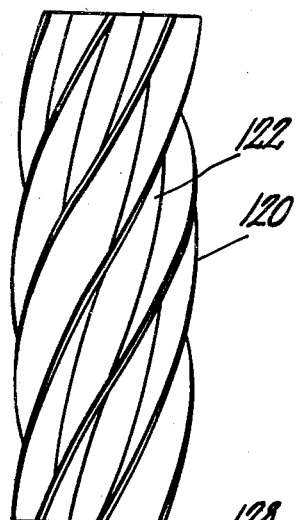
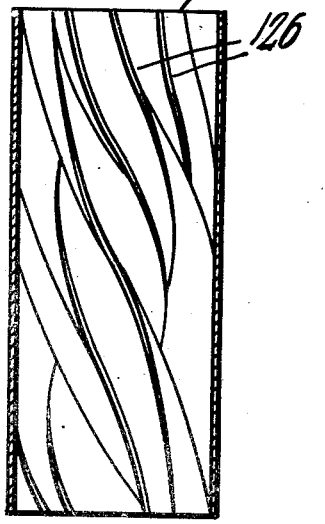
INVENTOR
Thomas M. Gluyas, Jr.
BY
ATTORNEY

United States Patent Office 2,707,772
Patented May 3, 1955

---

2,707,772

COAXIAL TRANSMISSION LINE SECTION

Thomas M. Gluyas, Jr., Westmont, N. J., assignor to Radio Corporation of America, a corporation of Delaware Application September 7, 1949, Serial No. 114,441

2 Claims. (Cl. 333—35)

The present invention is related to transmission lines, and more particularly to a transmission line section which may be used to connect two transmission line portions.

In high frequency transmitters, it is frequently necessary to match one section of transmission line to another, or to match a transmission line portion to another device. For example, it is frequently desired to match the impedance of a transmitter to that of an output transmission line. The transmitter may not have a fixed impedance, but on the contrary such transmitters frequently have impedances which vary whenever a new vacuum tube or power device is inserted, or whenever any of the various parts are replaced, due to variations between the removed and replaced parts. Furthermore, transmitters are usually designed to work into a load impedance which may have any one impedance value within a specified range of impedances, consequently some impedance changing or impedance matching device is required. It is particularly desirable, therefore, to have a transmission line transformer which may be adjusted from time to time as required to match the impedance of the output line to that of the transmitter so that maximum efficiency may be achieved. Such transmission line transformers are not necessarily limited in use to providing a matching connection between a transmitter and a transmission line but have a variety of uses, for example, to provide a desired degree of mismatch, and may be used wherever it is desired to connect one device to another where the impedance of one or the other, or both, may be subject to change from time to time.

It is an object of the present invention to provide a novel transmission line connecting section.

It is another object of the invention to provide a novel transmission line transformer.

It is another object of the invention to provide a novel transmission line section.

A further object of the invention is to provide such a transformer which may be used to match impedances between the circuit elements which it connects.

Another object of the invention is to provide such a transformer which may be adjusted from time to time to provide optimum results.

These and other objects, advantages, and novel features of the invention will become more fully apparent from the following description when taken in connection with the accompaning drawing, in which like reference numerals refer to like parts and in which:

Figure 2 is a top view of the power amplifier including a transverse cross-sectional view of the transmission line transformer;

Figure 3 is a transverse cross-sectional view illustrating one construction for the transformer line section of Figures 1 and 2;

Figure 4 is a transverse cross-sectional view of another embodiment of the transmission line transformer of the invention;

Figures 5 and 6 are respectively transverse and longitudinal cross-sectional views of still another embodiment of a transmission line transformer section in accordance with the invention;

Figure 7 is a transverse cross-sectional view of another embodiment of the invention; and Figures 8 and 8A are respectively a face view of the inner conductor of the embodiment of Figure 7 and a longitudinal cross-sectional view of the outer conductor of the embodiment of Figure 7.

Figure 1:
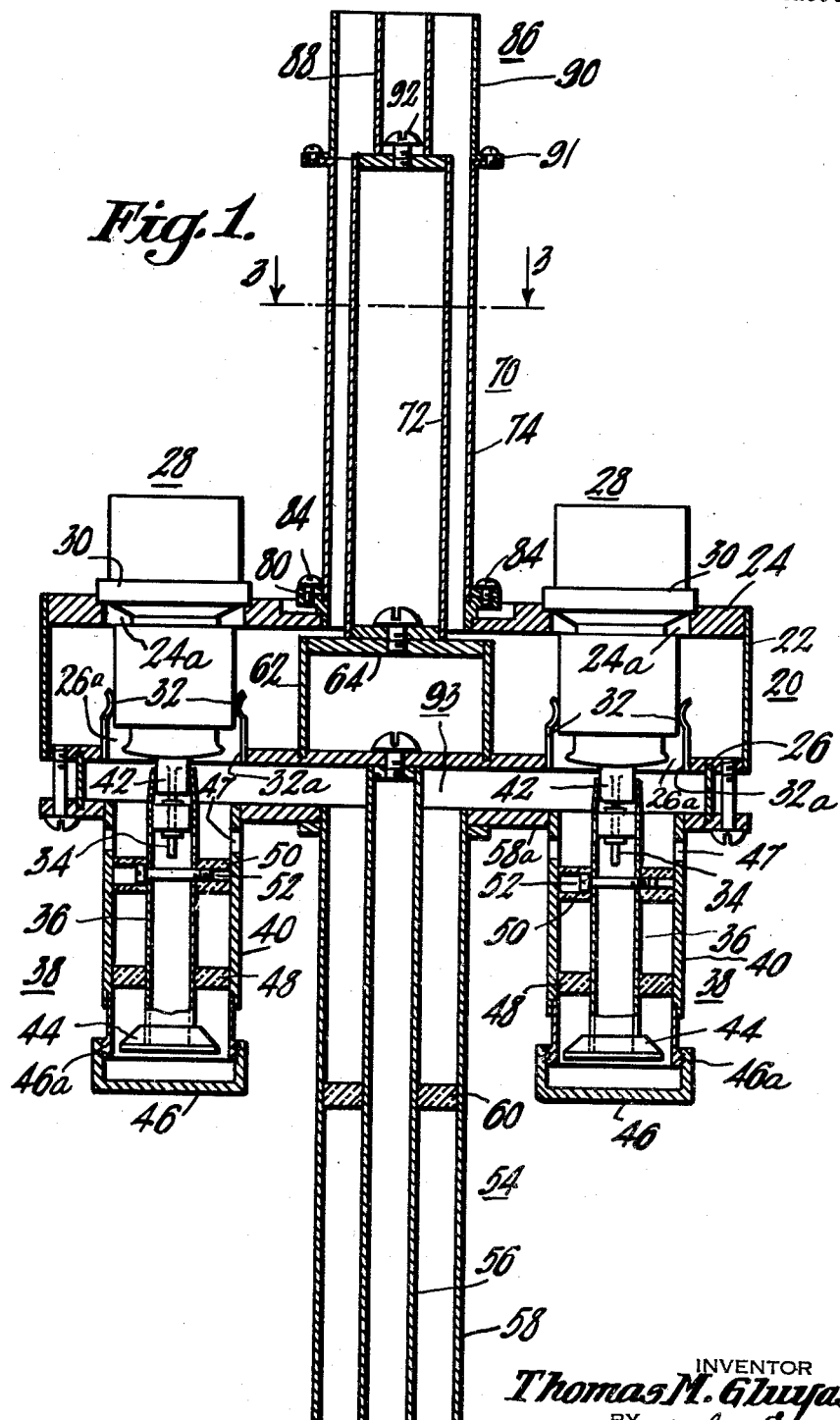
Figure 1 is a longitudinal cross-sectional view along line 1, 1 of Figure 2 of an assembly of a novel transmitter power amplifier for very high frequencies including a portion of the input line, the power amplifier, an impedance matching transformer section in accordance with the invention, and a portion of the output transmission line.

In accordance with the invention, I provide a transmission line transformer comprising a coaxial transmission line section with inner and outer conductors, at least one of said conductors being slotted and the other having complementary projections extending toward the slotted conductor, one of the conductors being rotatable about the axis of the line section to assume a desired position. Such rotation results in a variation of the characteristic impedance of the transmission line section. I prefer to make the transmission line section a quarter wavelength at the operating frequency. By effecting the rotation, I thus provide a quarter wavelength transformer which can provide an impedance match between the circuit elements which it connects. There may be exceptional cases in which an impedance mismatch is desired, in which cases the amount of mismatch may be varied within limits by the rotational adjustment.

Referring now more particularly to Figures 1 and 2, which are respectively a longitudinal cross-sectional view and a top view of an amplifier arrangement, my novel type of transmitter includes a doughnut or ring-shaped metallic cavity resonator 20 having an outer cylindrical wall 22 and top and bottom walls 24 and 26 respectively. The top and bottom walls 24 and 26 are apertured to receive vacuum tubes 28, which may be of the type 5588 with the anodes 30 seated in the apertures 24a of the top wall to make good connection therewith and close the cavity, and the grids are connected by suitable supporting spring fingers 32 to the periphery 32a of bottom wall apertures 26a substantially to close the cavity. The spring fingers 32 and the seating of the anodes 30 securely position the tubes 28 in the cavity resonator 20. A cathode heater lead 34 is brought out within the inner conductor 36 of a tuned grid-to-cathode line 38. The inner conductor 36 is connected to cathode pin 42 and is terminated at the end remote from the cathode by an enlarged disc portion 44. The disc portion 44 has a face spaced parallel to and a short distance from a cap 46 which is engaged by screw threads 46a on the outer conductor 40 of line 38. The inner conductor 36 is supported in place by dielectric spacers 48 and 50 one of which (50) is drilled to receive a screw 52 which is engaged transversely in inner conductor 36 as shown. The inner conductor is in this manner supported firmly against cathode pin 42 so that it cannot turn or twist and so that it makes good connection with the cathode pin 42. The grid-to-cathode line 38 is a tuned line, the tuning being effected by screwing the cap 46 into closer or further spacing from the disc portion 44 of inner conductor 36. Small apertures 47 in outer conductor 40 and inner conductor 36 provide access to the heater lead 34.

The input transmission line 54 has inner and outer conductors 56 and 58 respectively which may be spaced by spacers 60, only one of which is shown. The inner conductor 56 is connected directly to the bottom wall 26 of the cavity resonator which serves as a branch line therefrom through the spring fingers 32 to make connection with the grids of tubes 28. The outer conductor 58 of input line 54 leads to the outer conductor 40 of the tuned grid to cathode lines 38. Each line 38 preferably approximates electrically a quarter wavelength line capacitively tuned at the end near the cap 46 and thereby impresses an R. F. voltage between the grid connecting spring fingers 32 and the cathode pins 42.

In essence, the input impedances (grid-cathode impedance) of vacuum tubes 28 and of grid-to-cathode line 38 are serially connected across the conductors 26 and 58a and are adjusted to impose a capacitive reactance across these conductors. This reactance resonates with the inductive reactance formed by the extension of conductors 26 and 58a and the outer wall of the input cavity 93. If the reactances are suitably chosen with respect to the radio frequency input resistances of vacuum tubes 28 the tuned circuit thus formed will match the impedance of the input transmission line 54.

The inductance and capacitance in the various tubes 28 including the various leads, interelectrode capacitance, etc., are not necessarily identical from tube to tube. Therefore, it is desirable to provide means for adjusting the magnitude and phase of the R. F. excitation. This is accomplished by adjustment of the open-ended grid-to-cathode tuned line 38, preferably in the manner shown by adjusting the cap 46.

Cavity resonator 20 has also a central cylindrical conductor 62 closed on top by a disc 64. The resonator is excited by the R. F. currents flowing to and from the anodes 30 of tubes 28. The output from cavity resonator 20 is preferably taken by means of a coaxial transmission line, the first section of which is the coaxial transformer line section 70 of the present invention. The inner conductor 72 of the coaxial line section 70 (which may be considered a continuation of central conductor 62) is connected directly to the center conductor 62 of cavity resonator 20 by direct connection to the top plate 64 of cylinder 62. The power amplifier circuit is symmetrical about a center axis, power being applied and abstracted respectively through the coaxial transmission lines 54 and 70.

In a prior power amplifier circuit arrangement employing a doughnut or ring-shaped cavity resonator, a cavity resonator of effective electrical radius of a quarter wavelength has been employed, whereas the present novel arrangement employs a half wavelength effective radius of the cavity resonator 20. This arrangement is highly advantageous over the prior arrangement because the R. F. currents flow more or less symmetrically from the tube axis along the inner walls of the cavity resonator, whereas with the prior quarter wavelength arrangement, in order to place the tubes at points where high current excitations are desired, they must be placed close to the center axis of the structure. With high frequencies and using the prior arrangement, the result is that the currents are concentrated on the one side of each tube of the cluster, which tends to give high displacement currents over a limited portion of the tube. Such high current concentrations afford uneven heating, and if occurring over the tube seal tend to cause frequent failures; also the losses are increased with consequent reduction in power output. Although the currents in the arrangement of the present invention are concentrated to some extent, the concentration is less severe, and the currents tend to be more symmetrical from the tube axis than with the prior arrangement. Furthermore, in the present arrangement for the same frequency of operation a larger number of tubes may be employed since they are positioned on a larger radius than in the prior arrangement. By appropriate feed-back connection the arrangement can, of course, be made to operate as an oscillator. An amplifier as that disclosed herein has been used by me satisfactorily in a television transmitter and employing a plurality of tubes thus placed in electrically parallel relationship.

Referring now more particularly to the transformer transmission line section 70 of the present invention in the arrangement of Figures 1 and 2, and also referring to Figure 3, the outer conductor 74 is connected directly to the top 24 of the cavity resonator 20. The section 70 is preferably a quarter wavelength long at the operating frequency and includes vanes or fins 76 on the outer conductor 74 extending toward the inner conductor 72 and also extending axially the length of the section 70. The inner conductor has vanes or fins 78 extending substantially radially outward and throughout the axial length of the section 70. For the sake of drawing simplicity, vanes 76 and 78 are not shown in Figs. 1 and 2, however, they are shown in detail in Fig. 3. The vanes or fins 76 and 78 are preferably slightly displaced from the true radial planes so that adjacent faces in the position of closest adjustment are substantially parallel. Thus only one face of each vane or fin 76 or 78 is in a true radial plane, as shown. The outer conductor of section 70 may be provided with a flange 80 which has slots 82 through which clamping screws 84 may extend (engaging nuts, not shown) to clamp on to the adjoining conductor. Such an arrangement may be used at each end of the section (as shown) to assure good connection after adjustment. The outer conductor 74 of transmission line section 70 is thereby made rotatably adjustable. Screws 84 may be loosened, the outer conductor rotated to a desired position within limits, and the screws tightened again to make good connection. Other obvious mechanical arrangements may be utilized to perform a similar function. The section 70 may connect to an output coaxial transmission line 86 which may have, for example, an inner hollow conductor 88 and the outer conductor 90 of which may be a continuation of the outer conductor 74 by a flange 91 similar to the other flange arrangement as described and shown. A portion of the output line may be removable and it will be apparent that such removal would permit loosening of a contacting screw 92 connecting conductors 72 and 88 whereby the inner conductor 72 could also be adjustably rotated. I prefer to adjustably rotate the outer conductor 70 because of the easier mechanical construction. Obviously, such a matching section might be used on the input line if desired. It will be apparent that the adjustable transmission line transformer section of the invention may take a variety of forms.

Referring now to Figure 4, another constructional example is shown in transverse cross-sectional view. The inner conductor 100 of transmission line section 102 is slotted symmetrically with longitudinal slots 104 and a similar number of slots 106 are slotted on the inner face of outer conductor 108. It will be apparent that as the inner and outer conductors are rotated with respect to each other about the transmission line axis that the characteristic impedance of the line section will change.

Figures 5 and 6 which are respectively transverse and longitudinal cross-sectional views of still another embodiment in which the inner conductor 112 is hollow and symmetrically slotted longitudinally and the outer conductor 114 is similarly slotted. The slots 110 on the inner conductor 112 extend the entire axial length of the section and are slotted entirely through the conductor as are the slots 116 in the outer conductor 114. An outer conductor, such as 108, of Figure 4, may be combined with the inner conductor 112 of Figure 5 which is slotted through the metal. I have found, however, that slotting of the hollow inner conductor completely through the metal does not materially adversely affect the operation of the device. Neither does slotting through the metal of the outer conductor, as shown in Figures 5 and 6, if a shield 117, as shown, is provided about the transformer line section to inhibit radiation from the outer conductor slots 116.

Referring now more particularly to Figure 7 which is a tranverse cross-sectional view of still another embodiment of the invention, and the Figures 8 and 8A which are respectively a face view of the inner conductor of the embodiment of Figure 8 and a longitudinal cross-sectional view of the outer conductor of the embodiment of Figure 7 with the inner conductor removed, the vanes or fins 120 extending from inner conductor 122 of transmission line section 124 advance in a clockwise direction with axial distance along the transmission line section 124 and the corresponding vanes or fins 126 on outer conductor 128 similarly advance in a clockwise direction with axial distance along section 124. These vanes or fins thus resemble, to a certain degree, the lands of a rifle bore in the outer conductor, and find their counterpart on the inner conductor. Again, they may be compared to a threading and it will be observed that when so analogued the threads on the inner conductor and the threads on the outer conductor advance together. Thus, even if the vanes 126 extend into the spaces or slots between the vanes 120 and vice versa, a certain degree of rotation of the inner conductor 122 with respect to the outer conductor 128 may be effected without causing contact between the inner and outer conductor.

In practice, the extremes of the characteristic impedance of the matching section may be readily predetermined by calculating in advance the shunt capacitance of the section at the extremes of its adjustment by using the formula $Z_0 = v/c$ where $Z_0$ is characteristic impedance, $v$ is the wave velocity along the line which is substantially the velocity of light in vacuo when an air dielectric is employed, and $c$ is the shunt capacitance of the line. With a line section such as that of Figure 1 with the inner diameter of outer conductor 128 about 1.53 inches and the outer diameter of inner conductor 122 about 5/8 inch, and the vanes substantially the comparative size shown in Figure 1 (the drawing is approximately to scale) I obtain a matching section having a characteristic impedance readily adjustable from roughly 3½ to nine ohms. This easily provides the requisite range for matching the nominally half ohm output impedance of the amplifier cavity with tubes to the nominally 50 ohm output line to the antenna and allowing ample adjustment for variations from the nominal values.

It will be apparent that the invention describes a coaxial transmission line transformer which is capable of being adjusted to provide impedance matching between two circuit elements and which is compact, convenient, and readily adjusted to the desired impedance value.

The transmission line of the invention may take several forms. In any event, the adjustment may be made by rotating one conductor of the coaxial transmission line section with respect to the other without bringing the sections into contact in each case by a suitable mechanical arrangement, which may be similar to that illustrated and described in connection with Figures 1 to 3 to effect the adjustment. It will be apparent to those skilled in the art that the effect of such rotation is to vary the shunt capacitance across the line, thereby causing a variation in the characteristic impedance of the coaxial line section. For matching purposes, the transformer line section is preferably a quarter wavelength at the operating frequency, in which case for a perfect match the characteristic impedance of the section is the geometric mean between the impedances of the circuit elements connected by the section, in accordance with well-known theory.

What I claim is:

1. A coaxial transmission line section for use at a specified mean operating frequency comprising, an outer coaxial conductor having a plurality of inwardly extending projections parallel to the axis of said conductor and extending along the length thereof, said outer conductor being a small odd number of quarter wavelengths at the operating frequency, and an inner conductor coaxial with and substantially coextensive in length with said outer conductor having a plurality of complementary outwardly extending projections parallel to the axis of said inner conductor and extending along the length thereof, said inner and outer conductors being completely rotatable with respect to each other.

2. An impedance matching transformer section for use at a specified mean operating frequency and for connection between two circuit elements comprising, coaxial inner and outer conductors having substantially equal lengths, the length of each conductor being a small odd number of quarter wavelengths at the operating frequency, said outer conductor having a plurality of grooves formed in the inner surface thereof and extending along the length of said outer conductor parallel to its axis and said inner conductor being completely rotatable with respect to said outer conductor and having a plurality of complementary grooves formed in its outer surface and extending along the length of said inner conductor parallel to said axis.

References Cited in the file of this patent

UNITED STATES PATENTS

| | | |
|---|---|---|
| 1,441,212 | Cardwell | Jan. 9, 1923 |
| 2,306,333 | Conron et al. | Dec. 22, 1942 |
| 2,408,745 | Espley | Oct. 8, 1946 |
| 2,434,116 | McArthur | Jan. 6, 1948 |
| 2,448,554 | Simopoulos | Sept. 7, 1948 |
| 2,560,685 | Cooper | July 17, 1951 |
| 2,561,398 | Miller | July 24, 1951 |
| 2,567,748 | White | Sept. 11, 1951 |
| 2,582,604 | Pound | Jan. 15, 1952 |

FOREIGN PATENTS

| | | |
|---|---|---|
| 949,671 | France | Feb. 28, 1949 |